United States Patent
Li et al.

(10) Patent No.: US 12,093,725 B2
(45) Date of Patent: Sep. 17, 2024

(54) TASK PROCESSING METHOD, EQUIPMENT, STORAGE MEDIUM AND DEVICE

(71) Applicant: Chongqing University, Chongqing (CN)

(72) Inventors: Baizhan Li, Chongqing (CN); Baiyi Li, Chongqing (CN)

(73) Assignee: Chongqing University, Chongqing (CN)

( * ) Notice: Subject to any disclaimer, the term of this patent is extended or adjusted under 35 U.S.C. 154(b) by 1003 days.

(21) Appl. No.: 17/074,786

(22) Filed: Oct. 20, 2020

(65) Prior Publication Data
US 2021/0132989 A1    May 6, 2021

(30) Foreign Application Priority Data
Nov. 6, 2019    (CN) .......................... 201911078769.4

(51) Int. Cl.
G06Q 10/0631    (2023.01)
G06F 9/48    (2006.01)
(Continued)

(52) U.S. Cl.
CPC ............ *G06F 9/4881* (2013.01); *G06F 9/485* (2013.01); *G06F 17/16* (2013.01);
(Continued)

(58) Field of Classification Search
None
See application file for complete search history.

(56) References Cited

U.S. PATENT DOCUMENTS 7,024,669 B1 *  4/2006  Leymann ........... G06Q 10/0633
                                                      718/100
7,155,400 B1 *  12/2006  Jilk .................. G06Q 10/06316
                                                      705/7.41
(Continued)

FOREIGN PATENT DOCUMENTS

CA         2299945 A1    9/2000
CN      103473405 A  *  12/2013
(Continued)

OTHER PUBLICATIONS

Gunawan, Indra, andKamrulAhsan. "Projectschedulingimproveme ntusingdesignstructurematrix." International Journal of Project Organisation and Management 2.4(2010):311-327.(Year:2010) (Year: 2010).*
(Continued)

*Primary Examiner* — Romain Jeanty
(74) *Attorney, Agent, or Firm* — Westbridge IP LLC

(57) ABSTRACT

Disclosed are a task processing method, equipment, storage medium and device. The method includes: acquiring associated conditions of target tasks, and matching the associated conditions with the target tasks to obtain a matching result; establishing a task association table among the target tasks according to the matching result; acquiring an initial execution sequence of the target tasks, and generating a task matrix according to the initial execution sequence and the task association table; in a determination that the task matrix is not in a preset format, adjusting the initial execution sequence until a task matrix obtained according to the task association table and an adjusted execution sequence meets the preset format, and taking the adjusted execution sequence as a target execution sequence; and taking the target execution sequence as a task planning scheme of the target tasks.

19 Claims, 6 Drawing Sheets

(51) Int. Cl.
*G06F 17/16* (2006.01)
*G06Q 50/08* (2012.01)

(52) U.S. Cl.
CPC ....... *G06Q 10/06316* (2013.01); *G06Q 50/08* (2013.01); *G06F 2209/486* (2013.01)

(56) References Cited

U.S. PATENT DOCUMENTS

| | | | |
|---|---|---|---|
| 8,655,696 B2 * | 2/2014 | Akatsu | G06Q 10/10 |
| | | | 705/7.11 |
| 9,519,338 B2 | 12/2016 | Du | |
| 2008/0255909 A1 * | 10/2008 | Joshi | G06Q 10/06311 |
| | | | 705/7.13 |
| 2012/0035975 A1 * | 2/2012 | Sugimoto | G06Q 10/06 |
| | | | 705/7.26 |
| 2014/0297354 A1 * | 10/2014 | Kogiso | G06F 9/46 |
| | | | 705/7.26 |
| 2019/0114202 A1 | 4/2019 | Wang et al. | |

FOREIGN PATENT DOCUMENTS

| | | | | | |
|---|---|---|---|---|---|
| CN | 105159783 | A | | 12/2015 | |
| CN | 107622090 | A | | 1/2018 | |
| CN | 108764576 | A | | 11/2018 | |
| CN | 108874518 | A | | 11/2018 | |
| CN | 109117854 | A | | 1/2019 | |
| CN | 109685346 | A | | 4/2019 | |
| CN | 109901919 | A | | 6/2019 | |
| CN | 110096345 | A | | 8/2019 | |
| CN | 110348623 | A | * | 10/2019 | ............ G06Q 10/04 |
| JP | 2003030395 | A | * | 1/2003 | |
| WO | WO-0223371 | A2 | * | 3/2002 | ............ G06F 17/50 |

OTHER PUBLICATIONS

First Office Action issued in counterpart Chinese Patent Application No. 201911078769.4, dated Feb. 18, 2023.
Liu et al., Survey of optimal algorithm of design process model based on DSM, Computer Engineering and Applications, 2009, 45(11), pp. 22-25, dated Jan. 13, 2009.

* cited by examiner

TASK PROCESSING METHOD, EQUIPMENT, STORAGE MEDIUM AND DEVICE

CROSS REFERENCE TO RELATED APPLICATIONS

This disclosure claims the benefit of Chinese Patent Application No. 201911078769.4, filed on Nov. 6, 2019 and entitled "Task processing method, equipment, storage medium and device", the entirety of which is hereby incorporated herein by reference.

TECHNICAL FIELD

This disclosure relates to the technical field of engineering plan management, in particular to a task processing method, an equipment, a storage medium and a device.

BACKGROUND

At present, engineering project planning mainly relies on the personal experience of the planning engineer to determine the logical relationship among work tasks. Because personal experience and knowledge are limited, many work tasks and logical relationships are simplified. In addition, the "guess and estimate" approach is frequently used in the planning process to solve problem, leading to "separation of planning and execution". The dependencies among many tasks are ignored in the planning stage. In current practice, building construction methods are chosen depending only on personal preference, leading to further dynamic, complex and uncertain time and space conflicts, and there is a lack of systematic theoretical guidance for planning management, which is not exposed until the execution stage, leading to waste of time and cost of construction projects. Therefore, it is urgent to sort collaborative tasks to reduce time waste and cost.

The above content is only used to assist in understanding the technical solution of this disclosure, and does not mean that the above content is prior art.

SUMMARY

The main purpose of this disclosure is to provide a task processing method, an equipment, a storage medium and a device, which aims to solve the technical problem of how to optimize the plan management of complex projects through collaborative task sequencing in the related art.

To achieve the above purpose, this disclosure provides a task processing method, including:
  acquiring associated conditions of target tasks, and matching the associated conditions with the target tasks to obtain a matching result;
  establishing a task association table among the target tasks according to the matching result;
  acquiring an initial execution sequence of the target tasks, and generating a task matrix according to the initial execution sequence and the task association table;
  in a determination that the task matrix is not in a preset format, adjusting the initial execution sequence until a task matrix obtained according to the task association table and an adjusted execution sequence meets the preset format, and taking the adjusted execution sequence as a target execution sequence; and
  taking the target execution sequence as a task planning scheme of the target tasks.

In an embodiment, acquiring associated conditions of target tasks, and matching the associated conditions with the target tasks to obtain a matching result includes:
  traversing the target tasks, and taking a traversed target task as a current target task;
  acquiring an associated condition of the current target task;
  matching the associated condition with target tasks other than the current target task, and taking at least one target task successfully matched with the associated condition as at least one target task corresponding to the current target task; and
  after finishing traversing the target tasks, obtaining the matching result according to a correspondence among the target tasks.

In an embodiment, acquiring an initial execution sequence of the target tasks, and generating a task matrix according to the initial execution sequence and the task association table includes:
  acquiring the initial execution sequence of the target tasks and counting a number of the target tasks; and
  generating an initial matrix according to the number of the target tasks, and marking the initial matrix according to the initial execution sequence and the task association table to obtain the task matrix.

In an embodiment, generating an initial matrix according to the number of the target tasks, and marking the initial matrix according to the initial execution sequence and the task association table to obtain the task matrix includes:
  generating an initial matrix with N rows and N columns according to the number of the target tasks, where N is the number of the target tasks;
  taking the initial execution sequence as a row sequence of the matrix and a column sequence of the matrix; and
  marking the initial matrix according to the initial execution sequence, the column sequence, the row sequence, and the task association table to obtain the task matrix.

In an embodiment, in a determination that the task matrix is not in a preset format, adjusting the initial execution sequence until a task matrix obtained according to the task association table and an adjusted execution sequence meets the preset format, and taking the adjusted execution sequence as a target execution sequence includes:
  in a determination that the task matrix is not a minimum block matrix, adjusting the initial execution sequence according to the matching result until the task matrix is converted into a minimum block matrix;
  taking an execution sequence obtained by adjusting the initial execution sequence as an intermediate execution sequence;
  in a determination that the minimum block matrix is not a lower triangular matrix, adjusting the intermediate execution sequence until a task matrix obtained according to an adjusted execution sequence and the task association table is a lower triangular matrix; and
  taking an execution sequence obtained by adjusting the intermediate execution sequence as the target execution sequence.

In an embodiment, in a determination that the task matrix is not a minimum block matrix, adjusting the initial execution sequence according to the matching result until the task matrix is converted into a minimum block matrix includes:
  in a determination that the task matrix is not a minimum block matrix, establishing a circular relationship table among the target tasks according to the matching result;

clustering the target tasks according to the circular relationship table and the task association table to obtain at least one target task set; and acquiring characteristics of the at least one target task set, and adjusting the initial execution sequence according to the characteristics until the task matrix is converted into the minimum block matrix.

In an embodiment, establishing a task association table among the target tasks according to the matching result includes:

determining association relationship among the target tasks according to the matching result; and establishing the task association table among the target tasks according to the association relationship.

In addition, in order to achieve the above purpose, this disclosure further provides a task processing equipment including a memory, a processor, and a task processing program stored in the memory and executable on the processor, and the task processing program, when executed by the processor, implements the operations of the task processing method as described above.

In addition, in order to achieve the above purpose, this disclosure further provides a storage medium with a task processing program stored thereon, and the task processing program, when executed by the processor, implements the operations of the task processing method as described above.

In addition, in order to achieve the above purpose, this disclosure further provides a task processing device including: a matching module, a task association table establishment module, a matrix generation module, a target execution sequence generation module, and an execution sequence generation module;

the matching module is configured to acquire associated conditions of target tasks, and match the associated conditions with the target tasks to obtain a matching result;

the task association table establishment module is configured to establish a task association table among the target tasks according to the matching result;

the matrix generation module is configured to acquire an initial execution sequence of the target tasks, and generate a task matrix according to the initial execution sequence and the task association table;

the target execution sequence generation module is configured to adjust the initial execution sequence until a task matrix obtained according to the task association table and an adjusted execution sequence meets the preset format, and take the adjusted execution sequence as a target execution sequence, in a determination that the task matrix is not in a preset format; and the execution sequence generation module is configured to take the target execution sequence as a task planning scheme of the target tasks.

In this disclosure, acquiring associated conditions of target tasks, and matching the associated conditions with the target tasks to obtain a matching result; establishing a task association table among the target tasks according to the matching result; acquiring an initial execution sequence of the target tasks, and generating a task matrix according to the initial execution sequence and the task association table; in a determination that the task matrix is not in a preset format, adjusting the initial execution sequence until a task matrix obtained according to the task association table and an adjusted execution sequence meets the preset format, and taking the adjusted execution sequence as a target execution sequence; and taking the target execution sequence as a task planning scheme of the target tasks. In this way, through the method of dividing the minimum block matrix, task groups that contain loops or interdependent relationships may be quickly and efficiently merged, so as to realize the sorting of collaborative tasks and reduce time waste and cost.

The implementation, functional characteristics and advantages of this disclosure will be further described in conjunction with the embodiments and with reference to the drawings.

DETAILED DESCRIPTION OF THE EMBODIMENTS

It should be understood that the specific embodiments described herein are only used to explain this disclosure, and are not intended to limit this disclosure.

Figure 1:
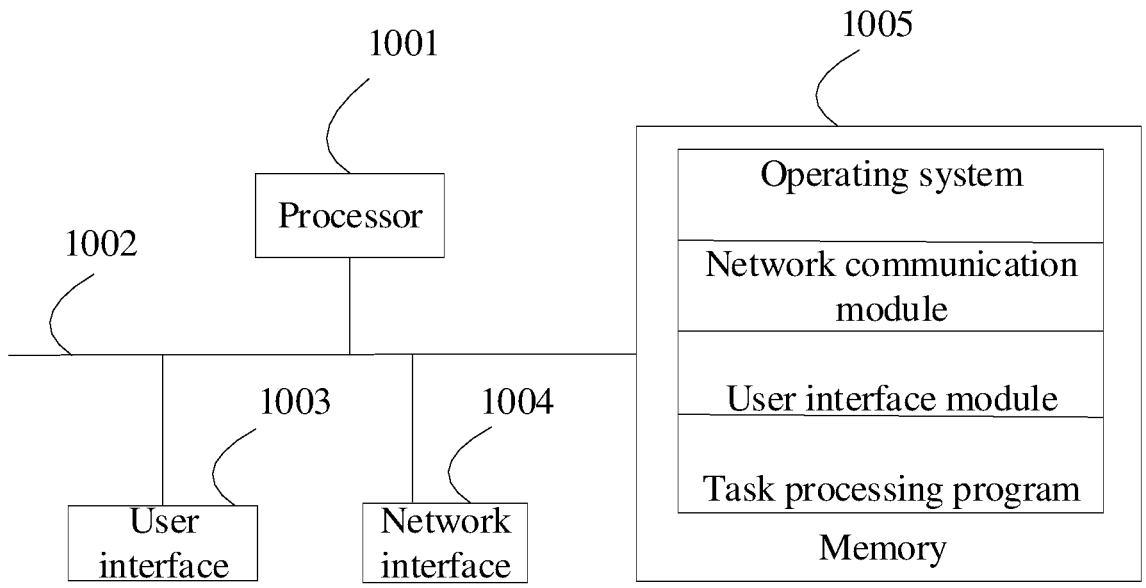
FIG. 1 is a schematic structural diagram of a task processing equipment in a hardware operating environment involved in an embodiment of this disclosure.

Referring to FIG. 1, FIG. 1 is a schematic structural diagram of a task processing equipment in a hardware operating environment involved in an embodiment of this disclosure.

As shown in FIG. 1, the task processing equipment may include: a processor 1001, such as a Central Processing Unit (CPU), a communication bus 1002, a user interface 1003, a network interface 1004, and a memory 1005. The communication bus 1002 is configured to implement connection communication among these components. The user interface 1003 may include a display, and optionally the user interface 1003 may further include a standard wired interface and a standard wireless interface, and the wired interface of the user interface 1003 may be a USB interface in this disclosure. The network interface 1004 may optionally include a standard wired interface and a standard wireless interface (such as a WI-FI interface). The memory 1005 may be a high-speed Random Access Memory (RAM) or a stable memory (non-volatile memory, NVM), such as a disk memory. The memory 1005 may optionally be a storage device independent of the foregoing processor 1001.

Those skilled in the art may understand that the structure shown in FIG. 1 does not constitute a limitation on the task processing equipment, and more or less components than those illustrated may be included, or certain components may be combined, or different components may be arranged.

As shown in FIG. 1, the memory 1005 recognized as a computer storage medium may include an operating system, a network communication module, a user interface module, and a task processing program.

In the task processing equipment shown in FIG. 1, the network interface 1004 is mainly configured to connect to a background server and communicate with the background server; the user interface 1003 is mainly configured to connect to user equipment; and the task processing equipment is configured to call the task processing program stored in the memory 1005 through the processor 1001 to execute the task processing method provided by the embodiments of this disclosure.

Based on the above hardware structures, some embodiments of the task processing method of this disclosure are provided.

Figure 2:
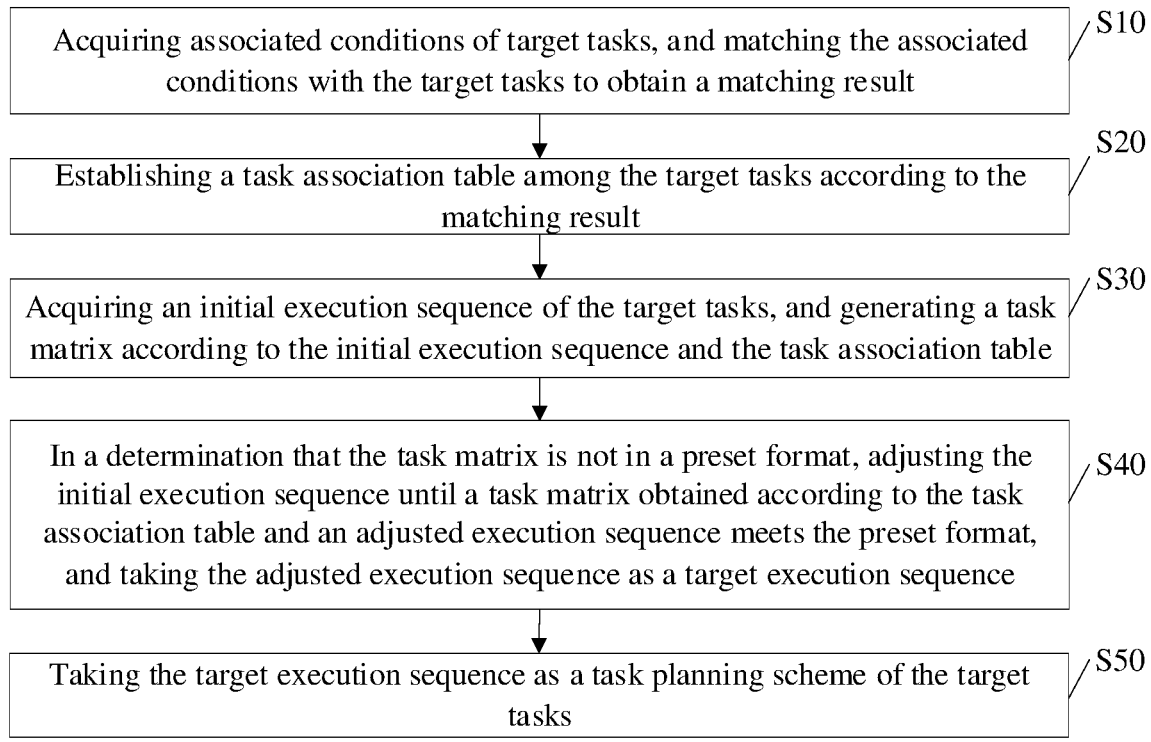
FIG. 2 is a schematic flowchart of a task processing method according to a first embodiment of this disclosure.

Referring to FIG. 2, FIG. 2 is a schematic flowchart of a task processing method according to a first embodiment of this disclosure, and a first embodiment of the task processing method of this disclosure is provided.

In the first embodiment, the task processing method includes:

S10: acquiring associated conditions of target tasks, and matching the associated conditions with the target tasks to obtain a matching result.

In a specific implementation, for example, there is a complicated logical relationship in an installation plan of the roof steel structure and the roof curtain wall of a certain 150-meter tower. In this case, due to the extremely narrow roof site of the 150-meter tower, the installation plan of the steel structure and the curtain wall of the roof was coordinated many times. After the ice shovel truck is in place under the tower, the steel may be transported to the top of the tower for construction, and the location of the ice shovel truck is further affected by a series of decisions. Firstly, five tasks that need to be coordinated are obtained: a. determination of the configuration of hoisting personnel; b. field survey of hoisting site conditions at work site; c. preparation of ice shovel hoisting protection plan; d. determination of steel structure installation plan; and e. determination of curtain wall installation plan. Then, the five tasks are matched, and it is obtained that the implementation of task a depends on the determination of task c; the implementation of task b depends on the determination of task a; task c and task b are interdependent (a, b, c form a loop); the implementation of task d depends on the determination of task c; and task d and task e are interdependent.

S20: establishing a task association table among the target tasks according to the matching result.

In a specific implementation, for example, a task association table among a, b, c, d, e is established according to the matching result.

S30: acquiring an initial execution sequence of the target tasks, and generating a task matrix according to the initial execution sequence and the task association table.

In a specific implementation, for example, it is acquired that the task execution sequence is a, b, c, d, e, the number of tasks is 5. A 5×5 matrix is defined, and the tasks are written into the outside of the matrix in the task execution sequence from top to bottom, from left to right.

S40: in a determination that the task matrix is not in a preset format, adjusting the initial execution sequence until a task matrix obtained according to the task association table and an adjusted execution sequence meets the preset format, and taking the adjusted execution sequence as a target execution sequence.

In a specific implementation, for example, it is determined whether the task matrix is a minimum block matrix and a lower triangular matrix. If the task execution sequence is a, b, c, d, e, the task matrix obtained is both the minimum block matrix and the lower triangular matrix. If the task matrix is not a minimum block matrix and a lower triangular matrix, adjust the task execution sequence until the conditions are met.

S50: taking the target execution sequence as a task planning scheme of the target tasks.

In a specific implementation, for example, taking the execution sequence a, b, c, d, e, as a planning scheme for the installation plan of the roof steel structure and roof curtain wall of a 150-meter tower.

In the first embodiment, acquiring associated conditions of target tasks, and matching the associated conditions with the target tasks to obtain a matching result; establishing a task association table among the target tasks according to the matching result; acquiring an initial execution sequence of the target tasks, and generating a task matrix according to the initial execution sequence and the task association table; in a determination that the task matrix is not in a preset format, adjusting the initial execution sequence until a task matrix obtained according to the task association table and an adjusted execution sequence meets the preset format, and taking the adjusted execution sequence as a target execution sequence; and taking the target execution sequence as a task planning scheme of the target tasks. In this way, through the method of dividing the minimum block matrix, task groups that contain loops or interdependent relationships may be quickly and efficiently merged, so as to realize the sorting of collaborative tasks and reduce time waste and cost.

Figure 3:
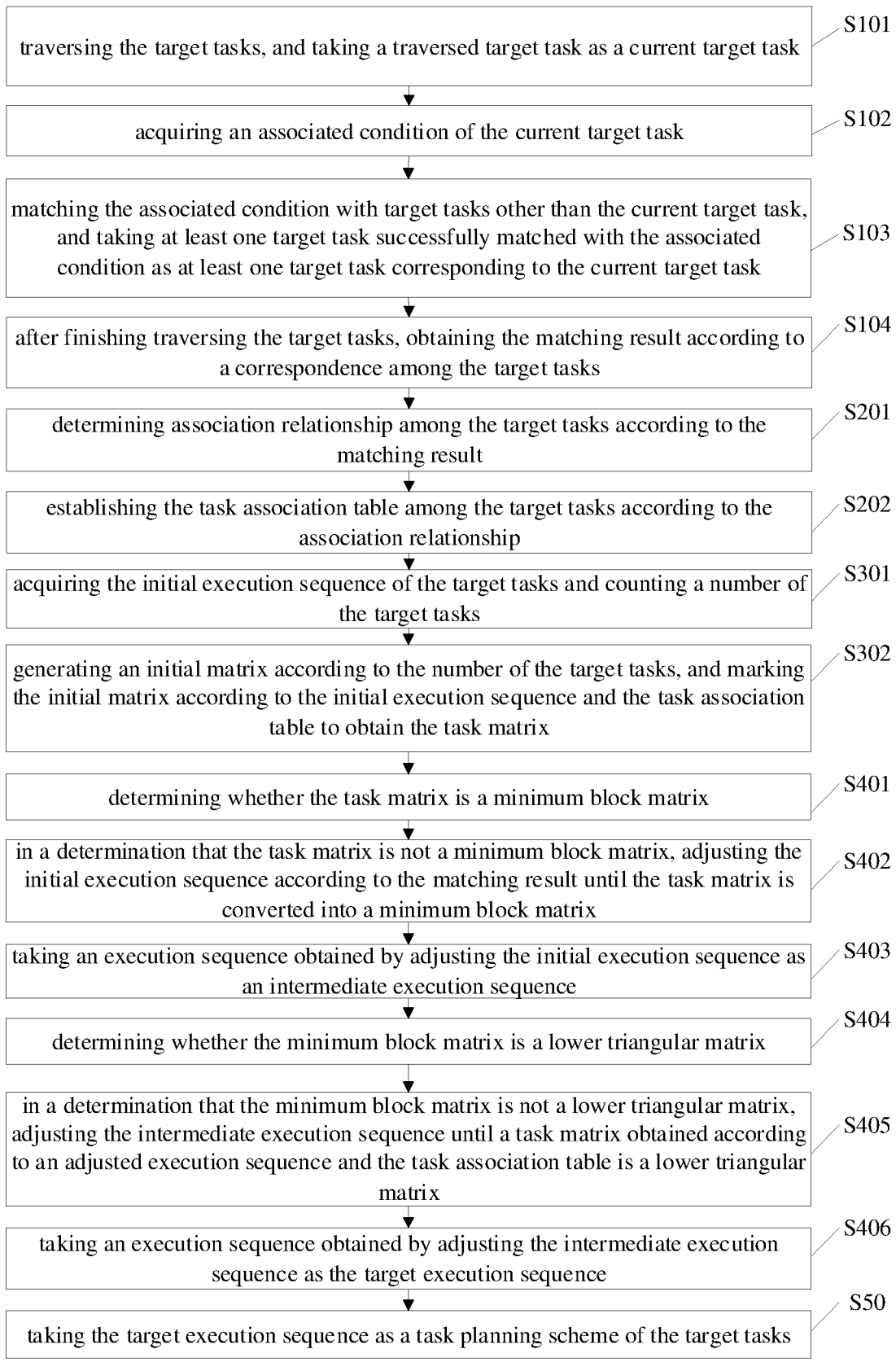
FIG. 3 is a schematic flowchart of the task processing method according to a second embodiment of this disclosure.

Referring to FIG. 3, FIG. 3 is a schematic flowchart of the task processing method according to a second embodiment of this disclosure. Based on the first embodiment shown in FIG. 2 above, a second embodiment of the task processing method of this disclosure is provided.

In the second embodiment, the operation S10 includes:

S101: traversing the target tasks, and taking a traversed target task as a current target task.

In a specific implementation, for example, five tasks for coordination are acquired: a. determination of the configuration of hoisting personnel; b. field survey of hoisting site conditions at work site; c. preparation of ice shovel hoisting protection plan; d. determination of steel structure installation plan; and e. determination of curtain wall installation plan. And the above five tasks are matched one by one.

S102: acquiring an associated condition of the current target task.

In a specific implementation, associated conditions are acquired as follows, for example, an associated condition of task a: preparation of ice shovel hoisting protection plan; an associated condition of task b: determination of the configuration of hoisting personnel and preparation of ice shovel hoisting protection plan; an associated condition of task c: field survey of hoisting site conditions at work site; an associated condition of task d: preparation of ice shovel hoisting protection plan and determination of curtain wall installation plan; and an associated condition of task e: determination of steel structure installation plan.

S103: matching the associated condition with target tasks other than the current target task, and taking at least one target task successfully matched with the associated condition as at least one target task corresponding to the current target task.

In a specific implementation, for example, taking task a as a current target task, and the associated condition of task a is preparation of ice shovel hoisting protection plan, so that preparation of ice shovel hoisting protection plan is matched with tasks b, c, d, e to obtain that task b matches task a, then task b corresponds to task a.

S104: after finishing traversing the target tasks, obtaining the matching result according to a correspondence among the target tasks.

In a specific implementation, for example, after traversing the task is finished, it is obtained that task a corresponds to task c, task b corresponds to tasks a and c, task c corresponds to task b, task d corresponds to tasks c and e, and task e corresponds to task d.

In the second embodiment, the operation S20 includes:

S201: determining association relationship among the target tasks according to the matching result.

In a specific implementation, for example, it is determined according to the matching result that the implementation of task a depends on the determination of task c; the implementation of task b depends on the determination of task a; task c and task b are interdependent (a, b, c form a loop); the implementation of task d depends on the determination of task c; and task d and task e are interdependent. And association relationship is established according to the dependency relationship among the tasks.

S202: establishing the task association table among the target tasks according to the association relationship.

In a specific implementation, for example, the task association table among tasks a, b, c, d, e is established according to the association relationship.

In the second embodiment, the operation S30 includes:

S301: acquiring the initial execution sequence of the target tasks and counting a number of the target tasks.

In a specific implementation, for example, the assumed task execution sequence is a, b, c, d, e, and the number of tasks is 5.

S302: generating an initial matrix according to the number of the target tasks, and marking the initial matrix according to the initial execution sequence and the task association table to obtain the task matrix.

In a specific implementation, for example, the number of tasks is 5, a 5×5 matrix is defined, and the tasks are written into the outside of the matrix in the task execution sequence from top to bottom, from left to right.

In the second embodiment, the operation S40 includes:

S401: determining whether the task matrix is a minimum block matrix.

Figures 4, 5:
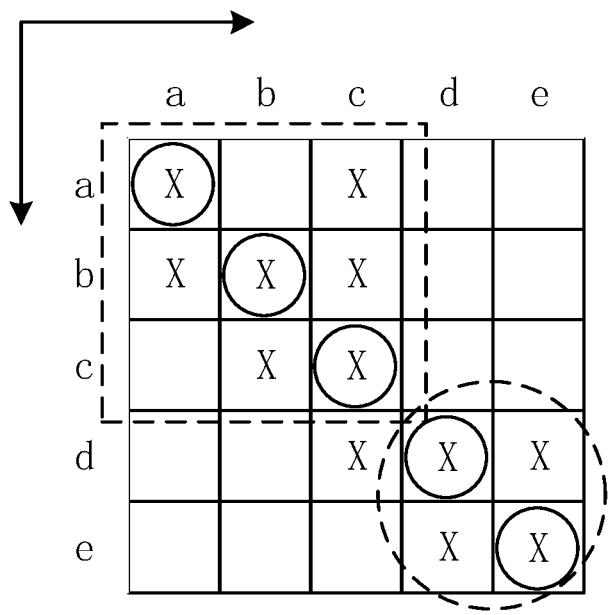
FIG. 4 is a schematic diagram of a matrix entry process of the task processing method according to the second embodiment of this disclosure.
FIG. 5 is a schematic diagram of a non-optimal task sequence of the task processing method according to the second embodiment of this disclosure.

In a specific implementation, for example, when the initial execution sequence is a, b, c, d, e, as shown in FIG. 4, the task matrix is in the distribution state of the minimum block matrix at this time. Assuming the initial execution sequence is a, e, c, d, b, according to the matching result, it can be seen that tasks a, b, c form a loop (and b and c are interdependent), and tasks d and e are interdependent. As shown in FIG. 5, the matrix is in 5×5 distribution at this time, and there is no distribution state of the minimum block matrix.

S402: in a determination that the task matrix is not a minimum block matrix, adjusting the initial execution sequence according to the matching result until the task matrix is converted into a minimum block matrix.

In a specific implementation, for example, the system may be divided into subsystems according to the cycle and association relationship among the tasks, and the sequence may be adjusted to a, b, c, d, e according to the characteristics of the subsystems.

S403: taking an execution sequence obtained by adjusting the initial execution sequence as an intermediate execution sequence.

In a specific implementation, for example, the sequence a, b, c, d, e is taken as the intermediate execution sequence.

S404: determining whether the minimum block matrix is a lower triangular matrix.

In a specific implementation, for example, X outside the minimum block matrix in FIG. 4 appears in the lower triangular area, which indicates that the implementation of task d in the circular dashed box depends on the determination of task c in the square dashed box, and at the time X, c has been determined, so there is no conflict, that is, the lower triangular matrix in FIG. 4 is optimal. When the task sequence has been distributed according to the minimum block matrix, but not the lower triangular matrix, as shown in the left matrix of FIG. 8 (execution sequence d, e, a, b, c), at this time, X outside the minimum block matrix falls into the upper triangle area (row 1, column 5), which indicates that the implementation of task d in the circular dashed box requires the determination of task c in the square dashed box, and task c is not yet determined, so there is a conflict.

S405: in a determination that the minimum block matrix is not a lower triangular matrix, adjusting the intermediate execution sequence until a task matrix obtained according to an adjusted execution sequence and the task association table is a lower triangular matrix.

Figure 8:
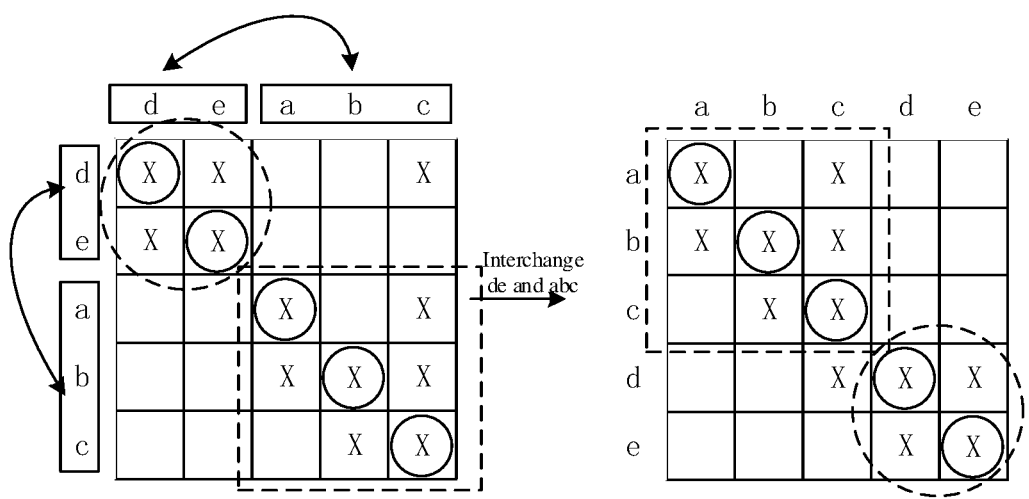
FIG. 8 is a schematic diagram of transformation of a minimum block matrix of the task processing method according to the third embodiment of this disclosure.

In a specific implementation, for example, after adjusting the task execution sequence (de and abc are interchanged), the left matrix of FIG. 8 becomes the right matrix of FIG. 8. At this time, X falls into the lower triangle area and there is no conflict. At this time, the task execution sequence is a, b, c, d, e.

S406: taking an execution sequence obtained by adjusting the intermediate execution sequence as the target execution sequence.

In a specific implementation, for example, the task execution sequence a, b, c, d, e is taken as the target execution sequence.

In the second embodiment, traversing the target tasks, and taking a traversed target task as a current target task; acquiring an associated condition of the current target task; matching the associated condition with target tasks other than the current target task, and taking at least one target task successfully matched with the associated condition as at least one target task corresponding to the current target task; after finishing traversing the target tasks, obtaining the matching result according to a correspondence among the target; determining association relationship among the target tasks according to the matching result; establishing the task association table among the target tasks according to the association relationship; acquiring the initial execution sequence of the target tasks and counting a number of the target tasks; generating an initial matrix according to the number of the target tasks, and marking the initial matrix according to the initial execution sequence and the task association table to obtain the task matrix; in a determination that the task matrix is not a minimum block matrix, adjusting the initial execution sequence according to the matching result until the task matrix is converted into a minimum block matrix; taking an execution sequence obtained by adjusting the initial execution sequence as an intermediate execution sequence; in a determination that the minimum block matrix is not a lower triangular matrix, adjusting the intermediate execution sequence until a task matrix obtained according to an adjusted execution sequence and the task association table is a lower triangular matrix; and taking an execution sequence obtained by adjusting the intermediate execution sequence as the target execution sequence. Through the method of dividing the minimum block matrix, it is possible to quickly and efficiently merge task groups that contain loops or interdependent relationships, so as to realize the sorting of collaborative tasks and reduce time waste and cost.

Figure 7:
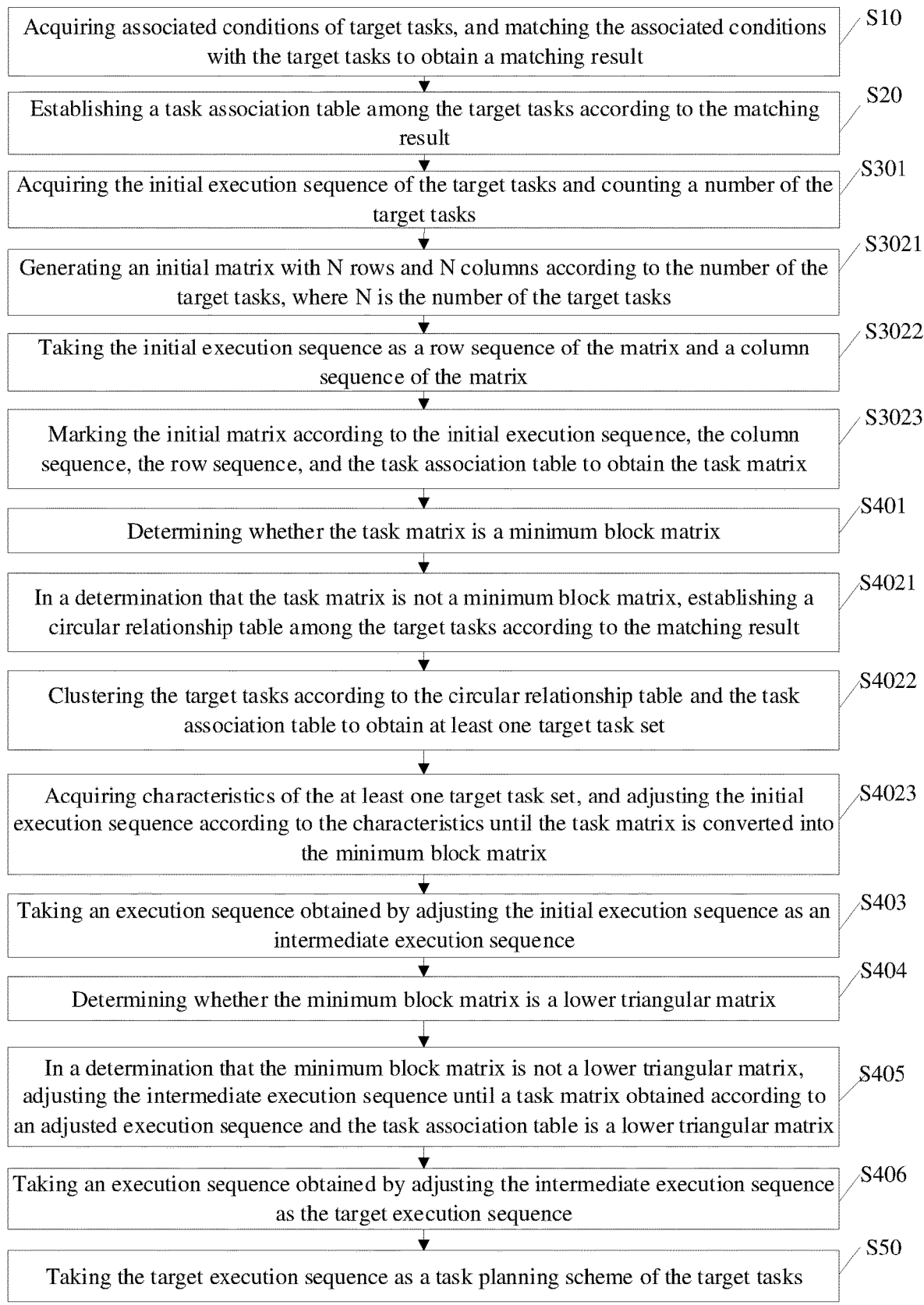
FIG. 7 is a schematic flowchart of the task processing method according to a third embodiment of this disclosure.

Referring to FIG. 7, FIG. 7 is a schematic flowchart of the task processing method according to a third embodiment of this disclosure. Based on the second embodiment shown in FIG. 3 above, a third embodiment of the task processing method of this disclosure is provided.

In the third embodiment, the operation S302 includes:

S3021: generating an initial matrix with N rows and N columns according to the number of the target tasks, where N is the number of the target tasks.

In a specific implementation, for example, the number of tasks is 5 and a 5×5 matrix is defined.

S3022: taking the initial execution sequence as a row sequence of the matrix and a column sequence of the matrix.

In a specific implementation, for example, if the task execution sequence is a, b, c, d, e, the row sequence and column sequence of the matrix are defined as a, b, c, d, e, respectively.

S3023: marking the initial matrix according to the initial execution sequence, the column sequence, the row sequence, and the task association table to obtain the task matrix.

In a specific implementation, for example, the task execution sequence is a, b, c, d, e, and the tasks are written into the outside of the matrix in the task execution sequence from top to bottom, from left to right. As shown in FIG. 4, the matrix in FIG. 4 is marked with X according to the task association table. "task a depends on task c" is marked with X in row 1, column 3; "task b depends on tasks a, c" is marked with X in row 2, columns 1 and 3; "task c depends on task b" is marked with X in row 3, column 2; "task d depends on task c, e" is marked with X in row 4, column 3 and 5; and "task e depends on task d" is marked with X in row 5, column 4. By observing the position of X in FIG. 4, the correlation among all tasks may be deduced backwards.

In the third embodiment, the operation S402 includes:

S4021: in a determination that the task matrix is not a minimum block matrix, establishing a circular relationship table among the target tasks according to the matching result.

In a specific implementation, for example, the system is divided into subsystems according to the cycle and association relationship table among the tasks. If the task execution sequence is not distributed according to the minimum block matrix, as shown in FIG. 5 (task execution sequence a, e, c, d, b), at this time, the matrix is in 5×5 distribution, and there is no distribution state of the minimum block matrix, that is, the 5×5 task relationship needs to be comprehensively considered, which is more difficult. At this time, the system needs to be divided into subsystems based on the specific circumstances of the cycle and interdependence among the tasks.

S4022: clustering the target tasks according to the circular relationship table and the task association table to obtain at least one target task set.

In a specific implementation, for example, tasks a, b, c form a loop (b and c are interdependent), and tasks d and e are interdependent, then the division method is dividing the system composed of task groups into a subsystem of a, b, c and a subsystem of d and e.

S4023: acquiring characteristics of the at least one target task set, and adjusting the initial execution sequence according to the characteristics until the task matrix is converted into the minimum block matrix.

Figure 6:
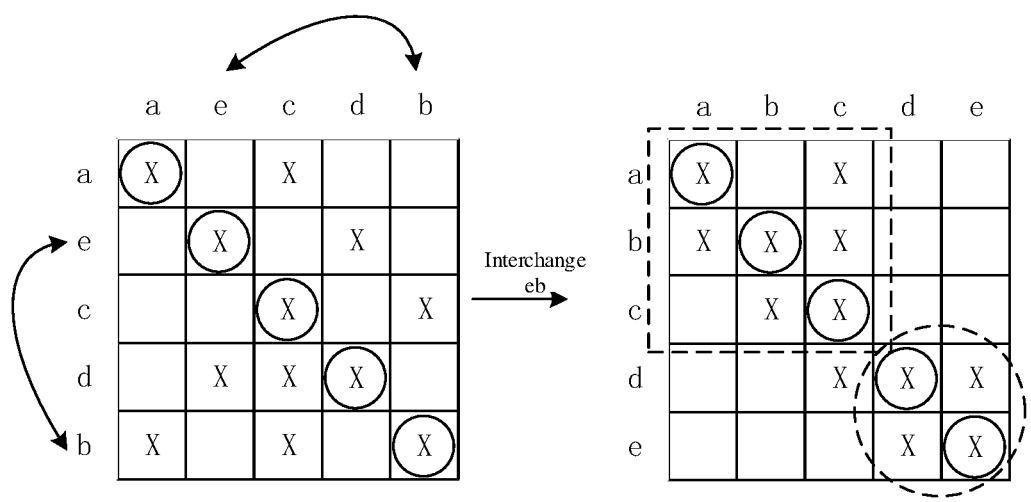
FIG. 6 is a schematic diagram of transformation of a lower triangular matrix of the task processing method according to the second embodiment of this disclosure.

In a specific implementation, for example, according to the characteristics of the subsystems, the original matrix is transformed into the minimum block matrix. According to the transformed subsystem distribution in FIG. 5, it can be seen that tasks a, b, c need to be classified, and tasks d, e need to be classified. Comparing with the original execution sequence a, e, c, d, b, it is found that reversing the sequence of tasks e and b may achieve the classification effect of the subsystems, as shown in FIG. 6. At this time, only the internal relationship of a 3×3 task block and a 2×2 task block and the association relationship between the two task blocks need to be considered, and the space complexity is greatly reduced.

In the third embodiment, acquiring associated conditions of target tasks, and matching the associated conditions with the target tasks to obtain a matching result; establishing a task association table among the target tasks according to the matching result; acquiring the initial execution sequence of the target tasks and counting a number of the target tasks; generating an initial matrix with N rows and N columns according to the number of the target tasks, where N is the number of the target tasks; taking the initial execution sequence as a row sequence of the matrix and a column sequence of the matrix; marking the initial matrix according to the initial execution sequence, the column sequence, the row sequence, and the task association table to obtain the task matrix; in a determination that the task matrix is not a minimum block matrix, establishing a circular relationship table among the target tasks according to the matching result; clustering the target tasks according to the circular relationship table and the task association table to obtain at least one target task set; acquiring characteristics of the at least one target task set, and adjusting the initial execution sequence according to the characteristics until the task matrix is converted into the minimum block matrix; taking an execution sequence obtained by adjusting the initial execution sequence as an intermediate execution sequence; in a determination that the minimum block matrix is not a lower triangular matrix, adjusting the intermediate execution sequence until a task matrix obtained according to an adjusted execution sequence and the task association table is a lower triangular matrix; taking an execution sequence obtained by adjusting the intermediate execution sequence as the target execution sequence; and taking the target execution sequence as a task planning scheme of the target tasks. Through the method of dividing the minimum block matrix, it is possible to quickly and efficiently merge task groups that contain loops or interdependent relationships, so as to realize the sorting of collaborative tasks and reduce time waste and cost.

In addition, an embodiment of this disclosure further provides a storage medium with a task processing program stored thereon, and the task processing program, when executed by the processor, implements the operations of the task processing method as described above.

Figure 9:
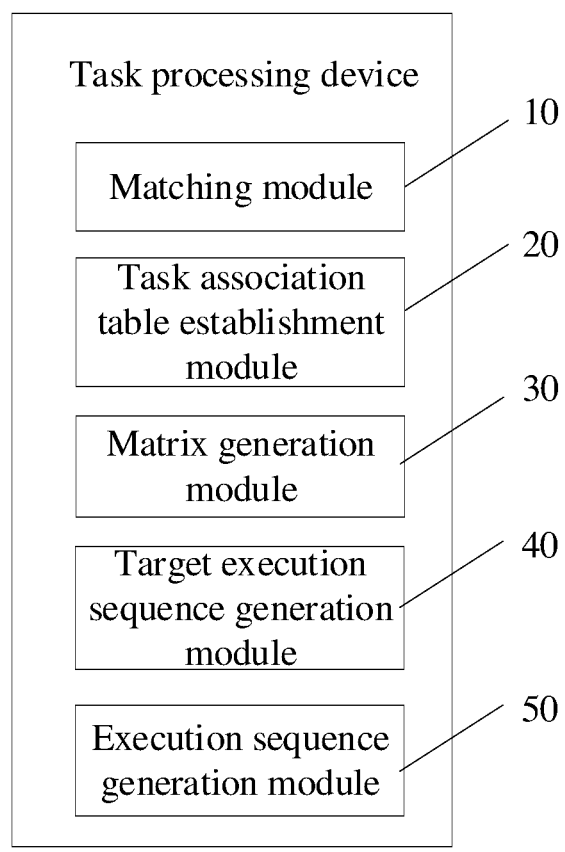
FIG. 9 is a structural block diagram of a task processing device according to a first embodiment of this disclosure.

In addition, referring to FIG. 9, an embodiment of this disclosure further provides a task processing device including: a matching module 10, a task association table establishment module 20, a matrix generation module 30, a target execution sequence generation module 40, and an execution sequence generation module 50.

The matching module 10 is configured to acquire associated conditions of target tasks, and match the associated conditions with the target tasks to obtain a matching result.

In a specific implementation, for example, there is a complicated logical relationship in the installation plan of the roof steel structure and the roof curtain wall of a certain 150-meter tower. In this case, due to the extremely narrow roof site of the 150-meter tower, the installation plan of the steel structure and the curtain wall of the roof was coordinated many times. After the ice shovel truck is in place under the tower, the steel may be transported to the top of the tower for construction, and the location of the ice shovel truck is further affected by a series of decisions. Firstly, five tasks that need to be coordinated are obtained: a. determination of the configuration of hoisting personnel; b. field survey of hoisting site conditions at work site; c. preparation of ice shovel hoisting protection plan; d. determination of steel structure installation plan; and e. determination of curtain wall installation plan. Then, the five tasks are matched, and it is obtained that the implementation of task a depends on the determination of task c; the implementation of task b depends on the determination of task a; task c and task b are interdependent (a, b, and c form a loop); the implementation of task d depends on the determination of task c; and task d and task e are interdependent.

The task association table establishment module 20 is configured to establish a task association table among the target tasks according to the matching result.

In a specific implementation, for example, a task association table among a, b, c, d, e is established according to the matching result.

The matrix generation module 30 is configured to acquire an initial execution sequence of the target tasks, and generate a task matrix according to the initial execution sequence and the task association table.

In a specific implementation, for example, it is acquired that the task execution sequence is a, b, c, d, e, the number of tasks is 5. A 5×5 matrix is defined, and the tasks are written into the outside of the matrix in the task execution sequence from top to bottom, from left to right.

The target execution sequence generation module 40 is configured to adjust the initial execution sequence until a task matrix obtained according to the task association table and an adjusted execution sequence meets the preset format, and take the adjusted execution sequence as a target execution sequence, in a determination that the task matrix is not in a preset format.

In a specific implementation, for example, it is determined whether the task matrix is a minimum block matrix and a lower triangular matrix. If the task execution sequence is a, b, c, d, e, the task matrix obtained is both the minimum block matrix and the lower triangular matrix. If the task matrix is not a minimum block matrix and a lower triangular matrix, adjust the task execution sequence until the conditions are met.

the execution sequence generation module 50 is configured to take the target execution sequence as a task planning scheme of the target tasks.

In a specific implementation, for example, taking the execution sequence a, b, c, d, e, as a planning scheme for the installation plan of the roof steel structure and roof curtain wall of a 150-meter tower.

In this embodiment, acquiring associated conditions of target tasks, and matching the associated conditions with the target tasks to obtain a matching result; establishing a task association table among the target tasks according to the matching result; acquiring an initial execution sequence of the target tasks, and generating a task matrix according to the initial execution sequence and the task association table; in a determination that the task matrix is not in a preset format, adjusting the initial execution sequence until a task matrix obtained according to the task association table and an adjusted execution sequence meets the preset format, and taking the adjusted execution sequence as a target execution sequence; and taking the target execution sequence as a task planning scheme of the target tasks. In this way, through the method of dividing the minimum block matrix, task groups that contain loops or interdependent relationships may be quickly and efficiently merged, so as to realize the sorting of collaborative tasks and reduce time waste and cost.

In an embodiment, the matching module is further configured to traverse the target tasks, and take a traversed target task as a current target task; acquire an associated condition of the current target task; match the associated condition with each of the target tasks, and take at least one target task successfully matched with the associated condition as at least one target task corresponding to the current target task; and after finishing traversing the target tasks, obtain the matching result according to a correspondence among the target.

In an embodiment, the task association table establishment module is further configured to determine association relationship among the target tasks according to the matching result; and establish the task association table among the target tasks according to the association relationship.

In an embodiment, the matrix generation module is further configured to acquire the initial execution sequence of the target tasks and counting a number of the target tasks; and generate an initial matrix according to the number of the target tasks, and mark the initial matrix according to the initial execution sequence and the task association table to obtain the task matrix.

In an embodiment, the matrix generation module is further configured to acquire the initial execution sequence of the target tasks and counting a number of the target tasks; generate an initial matrix with N rows and N columns according to the number of the target tasks, where N is the number of the target tasks; take the initial execution sequence as a row sequence of the matrix and a column sequence of the matrix; and mark the initial matrix according to the initial execution sequence, the column sequence, the row sequence, and the task association table to obtain the task matrix.

In an embodiment, the target execution sequence generation module is further configured to adjust the initial execution sequence according to the matching result until the task matrix is converted into a minimum block matrix, in a determination that the task matrix is not a minimum block matrix; take an execution sequence obtained by adjusting the initial execution sequence as an intermediate execution sequence; adjust the intermediate execution sequence until a task matrix obtained according to an adjusted execution sequence and the task association table is a lower triangular matrix, in a determination that the minimum block matrix is not a lower triangular matrix; and take an execution sequence obtained by adjusting the intermediate execution sequence as the target execution sequence.

In an embodiment, the target execution sequence generation module is further configured to establish a circular relationship table among the target tasks according to the matching result, in a determination that the task matrix is not a minimum block matrix; cluster the target tasks according to the circular relationship table and the task association table to obtain at least one target task set; acquire characteristics of the at least one target task set, and adjust the initial execution sequence according to the characteristics until the task matrix is converted into the minimum block matrix; take an execution sequence obtained by adjusting the initial execution sequence as an intermediate execution sequence; adjust the intermediate execution sequence until a task matrix obtained according to an adjusted execution sequence and the task association table is a lower triangular matrix, in a determination that the minimum block matrix is not a lower triangular matrix; and take an execution sequence obtained by adjusting the intermediate execution sequence as the target execution sequence.

For other embodiments or specific implementation manners of the task processing device of this disclosure, reference may be made to the foregoing method embodiments, which will not be repeated here.

It should be noted that in this disclosure, the terms "comprise", "include" or any other variant thereof are intended to cover non-exclusive inclusion, so that a process, method, article or system that includes a series of elements includes not only those elements, but also other elements that are not explicitly listed, or include elements inherent to this process, method, article, or system. Without more restrictions, the element defined by the sentence "comprise a . . . " does not exclude that there are other identical elements in the process, method, article or system that includes the element.

The sequence numbers of the above embodiments of this disclosure are for description only, and do not represent the advantages and disadvantages of the embodiments. In the unit claim listing several devices, several of these devices may be embodied by the same hardware item. The use of the words first, second, and third does not indicate any order, and these words can be interpreted as names.

Through the description of the above embodiments, those skilled in the art can clearly understand that the methods in the above embodiments can be implemented by means of software plus a necessary general hardware platform, and of course, can also be implemented by hardware, but in many cases the former is better. Based on this understanding, the technical solution of this disclosure can be embodied in the form of a software product in essence or part that contributes to the existing technology, and the computer software product is stored in a storage medium (such as Read Only Memory (ROM)/Random Access Memory (RAM), magnetic disk, optical disk) including several instructions to enable a terminal device (which may be a mobile phone, computer, server, air conditioner, or network device, etc.) to execute the methods described in the embodiments of this disclosure.

The above are only preferred embodiments of this disclosure and do not limit the patent scope of this disclosure. Any equivalent structure or equivalent process transformation made by the description and drawings of this disclosure, or directly or indirectly used in other related technical fields are similarly included in the patent protection scope of this disclosure.

What is claimed is:

1. A task processing method, applied to a task processing equipment comprising a memory, a processor, a communication bus, a user interface, and a network interface, wherein:
    the communication bus is configured to implement connection communication among the memory, the processor, the user interface, and the network interface,
    the network interface is configured to connect to a background server and communicate with the background server,
    the user interface is configured to connect to user equipment, and
    a task processing program is stored in the memory and executable on the processor, and the task processing program, when executed by the processor, implements the task processing method comprising:
    acquiring associated conditions of target tasks, and matching the associated conditions with the target tasks to obtain a matching result, wherein the target tasks comprise a determination of configuration of hoisting personnel, a field survey of hoisting site conditions at a work site, preparation of ice shovel hoisting protection plan, a determination of steel structure installation plan, and a determination of curtain wall installation plan;
    establishing a task association table among the target tasks according to the matching result;
    acquiring an initial execution sequence of the target tasks, and generating a task matrix according to the initial execution sequence and the task association table;
    in a determination that the task matrix is not in a preset format, adjusting the initial execution sequence until a task matrix obtained according to the task association table and an adjusted execution sequence meets the preset format, and taking the adjusted execution sequence as a target execution sequence; and
    taking the target execution sequence as a task planning scheme of the target tasks.

2. The task processing method of claim 1, wherein acquiring associated conditions of target tasks, and matching the associated conditions with the target tasks to obtain a matching result comprises:
    traversing the target tasks, and taking a traversed target task as a current target task;
    acquiring an associated condition of the current target task;
    matching the associated condition with target tasks other than the current target task, and taking at least one target task successfully matched with the associated condition as at least one target task corresponding to the current target task; and
    after finishing traversing the target tasks, obtaining the matching result according to correspondence among the target tasks.

3. The task processing method of claim 1, wherein acquiring an initial execution sequence of the target tasks, and generating a task matrix according to the initial execution sequence and the task association table comprises:
    acquiring the initial execution sequence of the target tasks and counting a number of the target tasks; and
    generating an initial matrix according to the number of the target tasks, and marking the initial matrix according to the initial execution sequence and the task association table to obtain the task matrix.

4. The task processing method of claim 3, wherein generating an initial matrix according to the number of the target tasks, and marking the initial matrix according to the initial execution sequence and the task association table to obtain the task matrix comprises:
    generating an initial matrix with N rows and N columns according to the number of the target tasks, where N is the number of the target tasks;
    taking the initial execution sequence as a row sequence of the matrix and a column sequence of the matrix; and marking the initial matrix according to the initial execution sequence, the column sequence, the row sequence, and the task association table to obtain the task matrix.

5. The task processing method of claim 1, wherein in a determination that the task matrix is not in a preset format, adjusting the initial execution sequence until a task matrix obtained according to the task association table and an adjusted execution sequence meets the preset format, and taking the adjusted execution sequence as a target execution sequence comprises:
in a determination that the task matrix is not a minimum block matrix, adjusting the initial execution sequence according to the matching result until the task matrix is converted into a minimum block matrix;
taking an execution sequence obtained by adjusting the initial execution sequence as an intermediate execution sequence;
in a determination that the minimum block matrix is not a lower triangular matrix, adjusting the intermediate execution sequence until a task matrix obtained according to an adjusted execution sequence and the task association table is a lower triangular matrix; and
taking an execution sequence obtained by adjusting the intermediate execution sequence as the target execution sequence.

6. The task processing method of claim 5, wherein in a determination that the task matrix is not a minimum block matrix, adjusting the initial execution sequence according to the matching result until the task matrix is converted into a minimum block matrix comprises:
in a determination that the task matrix is not a minimum block matrix, establishing a circular relationship table among the target tasks according to the matching result;
clustering the target tasks according to the circular relationship table and the task association table to obtain at least one target task set; and
acquiring characteristics of the at least one target task set, and adjusting the initial execution sequence according to the characteristics until the task matrix is converted into the minimum block matrix.

7. The task processing method of claim 1, wherein establishing a task association table among the target tasks according to the matching result comprises:
determining association relationship among the target tasks according to the matching result; and
establishing the task association table among the target tasks according to the association relationship.

8. A task processing equipment, comprising: a memory, a processor, a communication bus, a user interface, and a network interface, wherein:
the communication bus is configured to implement connection communication among the memory, the processor, the user interface, and the network interface, the network interface is configured to connect to a background server and communicate with the background server, the user interface is configured to connect to user equipment, and a task processing program stored in the memory and executable on the processor, and the task processing program, when executed by the processor, implements the following operations:
acquiring associated conditions of target tasks, and matching the associated conditions with the target tasks to obtain a matching result, wherein the target tasks comprises a determination of configuration of hoisting personnel, a field survey of hoisting site conditions at a work site, preparation of ice shovel hoisting protection plan, a determination of steel structure installation plan, and a determination of curtain wall installation plan;
establishing a task association table among the target tasks according to the matching result;
acquiring an initial execution sequence of the target tasks, and generating a task matrix according to the initial execution sequence and the task association table;
in a determination that the task matrix is not in a preset format, adjusting the initial execution sequence until a task matrix obtained according to the task association table and an adjusted execution sequence meets the preset format, and taking the adjusted execution sequence as a target execution sequence; and
taking the target execution sequence as a task planning scheme of the target tasks.

9. The task processing equipment of claim 8, wherein the task processing program, when executed by the processor, implements the following operations:
traversing the target tasks, and taking a traversed target task as a current target task;
acquiring an associated condition of the current target task;
matching the associated condition with target tasks other than the current target task, and taking at least one target task successfully matched with the associated condition as at least one target task corresponding to the current target task; and
after finishing traversing the target tasks, obtaining the matching result according to correspondence among the target tasks.

10. The task processing equipment of claim 8, wherein the task processing program, when executed by the processor, implements the following operations:
acquiring the initial execution sequence of the target tasks and counting a number of the target tasks; and
generating an initial matrix according to the number of the target tasks, and marking the initial matrix according to the initial execution sequence and the task association table to obtain the task matrix.

11. The task processing equipment of claim 10, wherein the task processing program, when executed by the processor, implements the following operations:
generating an initial matrix with N rows and N columns according to the number of the target tasks, where N is the number of the target tasks;
taking the initial execution sequence as a row sequence of the matrix and a column sequence of the matrix; and
marking the initial matrix according to the initial execution sequence, the column sequence, the row sequence, and the task association table to obtain the task matrix.

12. The task processing equipment of claim 8, wherein the task processing program, when executed by the processor, implements the following operations:
in a determination that the task matrix is not a minimum block matrix, adjusting the initial execution sequence according to the matching result until the task matrix is converted into a minimum block matrix;
taking an execution sequence obtained by adjusting the initial execution sequence as an intermediate execution sequence;
in a determination that the minimum block matrix is not a lower triangular matrix, adjusting the intermediate execution sequence until a task matrix obtained according to an adjusted execution sequence and the task association table is a lower triangular matrix; and taking an execution sequence obtained by adjusting the intermediate execution sequence as the target execution sequence.

13. The task processing equipment of claim 12, wherein the task processing program, when executed by the processor, implements the following operations:
in a determination that the task matrix is not a minimum block matrix, establishing a circular relationship table among the target tasks according to the matching result;
clustering the target tasks according to the circular relationship table and the task association table to obtain at least one target task set; and
acquiring characteristics of the at least one target task set, and adjusting the initial execution sequence according to the characteristics until the task matrix is converted into the minimum block matrix.

14. A storage medium, applied to a task processing equipment comprising the storage medium, a processor, a communication bus, a user interface, and a network interface, wherein:
the communication bus is configured to implement connection communication among the storage medium, the processor, the user interface, and the network interface, the network interface is configured to connect to a background server and communicate with the background server, the user interface is configured to connect to user equipment, and a task processing program is stored on the storage medium and executable on the processor, and the task processing program, when executed by a processor, implements the following operations:
acquiring associated conditions of target tasks, and matching the associated conditions with the target tasks to obtain a matching result, wherein the target tasks comprises a determination of configuration of hoisting personnel, a field survey of hoisting site conditions at a work site, preparation of ice shovel hoisting protection plan, a determination of steel structure installation plan, and a determination of curtain wall installation plan;
establishing a task association table among the target tasks according to the matching result;
acquiring an initial execution sequence of the target tasks, and generating a task matrix according to the initial execution sequence and the task association table;
in a determination that the task matrix is not in a preset format, adjusting the initial execution sequence until a task matrix obtained according to the task association table and an adjusted execution sequence meets the preset format, and taking the adjusted execution sequence as a target execution sequence; and
taking the target execution sequence as a task planning scheme of the target tasks.

15. The storage medium of claim 14, wherein the task processing program, when executed by a processor, implements the following operations:
traversing the target tasks, and taking a traversed target task as a current target task;
acquiring an associated condition of the current target task;
matching the associated condition with target tasks other than the current target task, and taking at least one target task successfully matched with the associated condition as at least one target task corresponding to the current target task; and
after finishing traversing the target tasks, obtaining the matching result according to correspondence among the target tasks.

16. The storage medium of claim 14, wherein the task processing program, when executed by a processor, implements the following operations:
acquiring the initial execution sequence of the target tasks and counting a number of the target tasks; and
generating an initial matrix according to the number of the target tasks, and marking the initial matrix according to the initial execution sequence and the task association table to obtain the task matrix.

17. The storage medium of claim 16, wherein the task processing program, when executed by a processor, implements the following operations:
generating an initial matrix with N rows and N columns according to the number of the target tasks, where N is the number of the target tasks;
taking the initial execution sequence as a row sequence of the matrix and a column sequence of the matrix; and
marking the initial matrix according to the initial execution sequence, the column sequence, the row sequence, and the task association table to obtain the task matrix.

18. The storage medium of claim 14, wherein the task processing program, when executed by a processor, implements the following operations:
in a determination that the task matrix is not a minimum block matrix, adjusting the initial execution sequence according to the matching result until the task matrix is converted into a minimum block matrix;
taking an execution sequence obtained by adjusting the initial execution sequence as an intermediate execution sequence;
in a determination that the minimum block matrix is not a lower triangular matrix, adjusting the intermediate execution sequence until a task matrix obtained according to an adjusted execution sequence and the task association table is a lower triangular matrix; and
taking an execution sequence obtained by adjusting the intermediate execution sequence as the target execution sequence.

19. The storage medium of claim 18, wherein the task processing program, when executed by a processor, implements the following operations:
in a determination that the task matrix is not a minimum block matrix, establishing a circular relationship table among the target tasks according to the matching result;
clustering the target tasks according to the circular relationship table and the task association table to obtain at least one target task set; and
acquiring characteristics of the at least one target task set, and adjusting the initial execution sequence according to the characteristics until the task matrix is converted into the minimum block matrix.

* * * * *